(12) United States Patent
Paradis et al.

(10) Patent No.: US 12,509,022 B2
(45) Date of Patent: Dec. 30, 2025

(54) ALTERNATIVE METHODS FOR OPENING DOORS AND HATCHES

(71) Applicant: Toyota Motor Engineering & Manufacturing North America, Inc., Plano, TX (US)

(72) Inventors: Alexander L. Paradis, Ann Arbor, MI (US); Frank A. Richards, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 579 days.

(21) Appl. No.: 17/735,323

(22) Filed: May 3, 2022

(65) Prior Publication Data

US 2023/0356694 A1  Nov. 9, 2023

(51) Int. Cl.
*B60R 25/34* (2013.01)
*B60R 25/01* (2013.01)
(Continued)

(52) U.S. Cl.
CPC ............. *B60R 25/34* (2013.01); *B60R 25/01* (2013.01); *B60R 25/23* (2013.01); *B60R 25/245* (2013.01);
(Continued)

(58) Field of Classification Search
CPC ......... B60R 25/34; B60R 25/01; B60R 25/23; B60R 25/245; B60R 25/30; B60R 25/305;
(Continued)

(56) References Cited

U.S. PATENT DOCUMENTS

| 6,236,333 B1* | 5/2001 | King | ................... B60R 25/2036 340/5.1 |
| 7,548,491 B2* | 6/2009 | Macfarlane | ........... B60R 25/257 379/102.01 |

(Continued)

FOREIGN PATENT DOCUMENTS

| CN | 102852407 B | 10/2015 |
| CN | 105569491 B | 7/2017 |

(Continued)

OTHER PUBLICATIONS

Tesla Model X Owner's Manual (Doors), www.tesla.com, 9 pages, Oct. 24, 2021, retrieved from Internet <https://www.tesla.com/ownersmanual/modelx/en_us/GUID-7A32EC01-A17E-42CC-A15B-2E0A39FD07AB.html>.

(Continued)

*Primary Examiner* — Gertrude Arthur Jeanglaude
(74) *Attorney, Agent, or Firm* — DINSMORE & SHOHL LLP

(57) ABSTRACT

A vehicle system for a vehicle is provided. The vehicle system includes an electronic control unit configured to receive a signal from a key fob, and determine whether the key fob is within a predetermined distance from the vehicle based on the received signal. Upon determination that the key fob is within the predetermined distance from the vehicle, the electronic control unit determines whether a predetermined action has been performed by a user based on an output from one or more vehicle sensors. Upon determination that the predetermined action has been performed, the electronic control unit causes a component of the vehicle to at least one of unlock and open.

17 Claims, 3 Drawing Sheets

(51) Int. Cl.
  *B60R 25/23* (2013.01)
  *B60R 25/24* (2013.01)
  *B60R 25/30* (2013.01)
  *E05B 81/76* (2014.01)
  *E05F 15/76* (2015.01)
  *E05F 15/73* (2015.01)

(52) U.S. Cl.
  CPC ............ *B60R 25/30* (2013.01); *B60R 25/305* (2013.01); *E05B 81/77* (2013.01); *E05F 15/76* (2015.01); *E05F 2015/767* (2015.01); *E05Y 2400/44* (2013.01); *E05Y 2400/45* (2013.01); *E05Y 2400/86* (2013.01); *E05Y 2800/176* (2013.01); *E05Y 2900/531* (2013.01); *E05Y 2900/534* (2013.01); *E05Y 2900/536* (2013.01); *E05Y 2900/546* (2013.01)

(58) Field of Classification Search
  CPC . E05B 81/77; E05Y 2400/44; E05Y 2400/45; E05Y 2400/86; E05Y 2800/176; E05Y 2900/531; E05Y 2900/546; E05Y 2900/536; E05F 15/76
  See application file for complete search history.

(56) References Cited

U.S. PATENT DOCUMENTS

| | | | | |
|---|---|---|---|---|
| 8,847,731 | B2 * | 9/2014 | Tieman | G07C 9/00309 340/426.36 |
| 9,858,735 | B2 * | 1/2018 | Spahl | H04W 52/02 |
| 11,725,451 | B2 * | 8/2023 | Lin | E05F 15/73 49/31 |
| 2005/0099275 | A1 * | 5/2005 | Kamdar | B60R 25/2081 340/426.18 |
| 2010/0185341 | A1 * | 7/2010 | Wilson | B60R 25/2045 701/1 |
| 2016/0281410 | A1 * | 9/2016 | Schanz | E05B 81/16 |
| 2017/0362878 | A1 * | 12/2017 | Gage | E05F 15/75 |
| 2019/0032391 | A1 * | 1/2019 | Lavoie | H04Q 9/00 |
| 2020/0310407 | A1 * | 10/2020 | Van Wiemeersch | B62D 15/0285 |
| 2020/0355509 | A1 * | 11/2020 | Lowe | G01C 21/3423 |
| 2021/0291786 | A1 * | 9/2021 | Cisneros | B60R 25/01 |

FOREIGN PATENT DOCUMENTS

| | | |
|---|---|---|
| CN | 104786988 B | 7/2018 |
| KR | 20170041345 A | 4/2017 |
| KR | 101840259 B1 | 5/2018 |

OTHER PUBLICATIONS

Tesla Model X Owner's Manual (Keys), www.tesla.com, 12 pages, Oct. 24, 2021, retrieved from Internet <https://www.tesla.com/ownersmanual/modelx/en_us/GUID-E004FAB7-1C71-448F-9492-CACF301304D2.html>.

Screen captures from YouTube video entitled "How do you open the Cybertruck doors?", 12 pages, uploaded on Mar. 26, 2024 by user @LamarMK, retrieved from Internet: <https://www.youtube.com/shorts/In6LRnYL-W0>.

* cited by examiner

ALTERNATIVE METHODS FOR OPENING DOORS AND HATCHES

TECHNICAL FIELD

The present specification generally relates to vehicle systems and, more specifically, to alternative methods for opening doors and hatches.

BACKGROUND

Keyless entry systems allow drivers to unlock vehicles without manually inserting a key into a vehicle lock. However, drivers typically have to physically utilize a door handle to open a door or trunk of a vehicle. Yet, there may be times when a driver's hands are full (e.g., carrying groceries or other packages) and it is difficult for the driver to physically use a door handle to open a vehicle's door or trunk. Accordingly, a need exists for alternative methods for opening doors and hatches.

SUMMARY

In an embodiment, a vehicle system for a vehicle is provided. The vehicle system may include an electronic control unit. The electronic control unit may receive a signal from a key fob, and determine whether the key fob is within a predetermined distance from the vehicle based on the received signal. Upon determination that the key fob is within the predetermined distance from the vehicle, the electronic control unit may determine whether a predetermined action has been performed by a user based on an output from one or more vehicle sensors. Upon determination that the predetermined action has been performed, the electronic control unit may cause a component of the vehicle to at least unlock or open.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

A vehicle system according to the present disclosure includes an electronic control unit (ECU) and a plurality of sensors mounted to a vehicle. The sensors may detect a keyless entry device (e.g., a key fob) carried by a driver in a vicinity of the vehicle. The sensors may also detect actions performed by a driver with respect to certain vehicle components of the vehicle. For example, sensors may detect movement of a vehicle component, pressure applied to a vehicle component, or sound caused by contact to a vehicle component. When the vehicle sensors detect certain physical actions performed on the vehicle while the key fob is detected near the vehicle, the ECU may actuate one or more vehicle components (e.g., opening a vehicle door, opening a window, or opening the trunk).

As such, when a driver approaching a vehicle has their hands full, the driver may open the door or trunk of the vehicle by performing an action when the key fob is in their pocket or otherwise on their person. For example, the driver may knock on a window, move a side-view mirror (e.g., open or close a side-view mirror), or press down on the hood of the vehicle to automatically unlock and/or open a door or the trunk of the vehicle.

Figure 1:
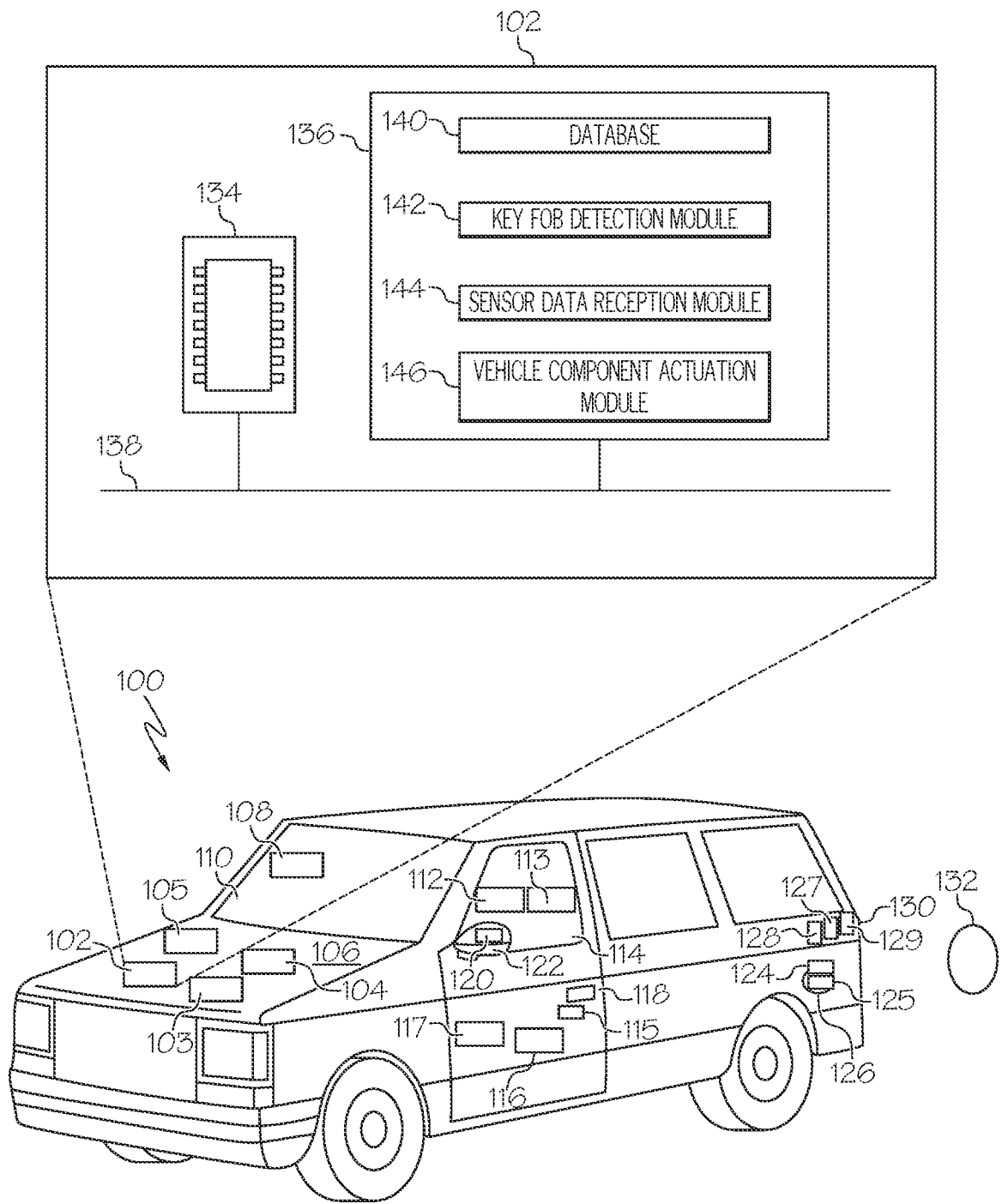
FIG. 1 schematically depicts a perspective view of a vehicle for performing alternative methods for opening doors and hatches, according to one or more embodiments shown and described herein.

Referring to FIG. 1 a vehicle 100 is general depicted. In embodiments, the vehicle 100 may be a car, a truck, a sports utility vehicle, a van, or other types of vehicles. The vehicle 100 may include an electronic control unit (ECU) 102, sensors 104, 108, 112, 116, 120, 124, and 128, locking mechanisms 103, 115, and 127, and actuators 105, 113, 117, 125, and 129. A key fob 132 may be utilized as part of a keyless entry system for the vehicle 100. In particular, the ECU 102 may detect when the key fob 132 is within a predetermined distance from the vehicle 100, as disclosed herein. In other examples, the ECU 102 may utilize other techniques as part of a keyless entry system for the vehicle 100. For example, the ECU 102 may detect when a smartphone or other device is within a predetermined distance from the vehicle 100, or the ECU 102 may perform facial recognition of a driver standing next to the vehicle 100.

The sensors 104, 108, 112, 116, 120, 124, 128 may each detect when a vehicle component of the vehicle 100 is moved and/or contacted by a user (e.g., a driver carrying the key fob 132).

Figure 2A:
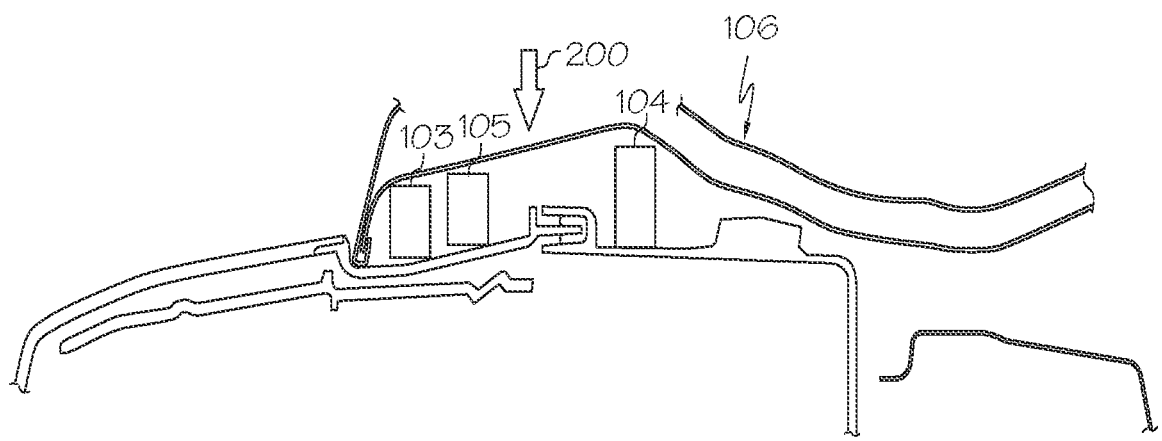
FIG. 2A schematically depicts a vehicle hood of the vehicle of FIG. 1, according to one or more embodiments shown and described herein.

The sensor 104 may detect when a hood 106 of the vehicle 100 is moved. Specifically, a hood of a vehicle, even when closed, may allow for a small range of motion in a vertical direction, as shown in FIG. 2A. As such, in embodiments, a user may press down on the hood 106 (e.g., along direction 200 of FIG. 2A) and the sensor 104 may detect the motion of the hood 106. The sensor 104 may comprise a motion sensor that detects motion of the hood 106, a pressure sensor that detects pressure applied to the hood 106, or a camera that captures video of the hood 106 and detects motion of the hood 106 based on the captured video. In embodiments, the sensor 104 may be placed within the hood 106 or on an external or internal surface of the hood 106.

Referring back to FIG. 1, the sensor 108 may detect when a user taps a front window 110 of the vehicle 100. For example, a user may tap the front window 110 with one of their hands. In embodiments, the sensor 108 may comprise a pressure sensor that detects pressure applied to the front window 110 of a microphone that detects sound caused by the front window 110 being tapped. In embodiments, the sensor 108 may be placed on an external or internal surface of the front window 110 or inside the vehicle 100.

The sensor 112 may detect when a user taps a side window 114 of the vehicle 100. For example, a user may tap the side window 114 with one of their hands. In embodiments, the sensor 112 may comprise a pressure sensor that detects pressure applied to the side window 114 or a microphone that detects sound caused by the side window 114 being tapped. The sensor 112 may be placed on an external or internal surface of the side window 114 or inside the vehicle 100.

The sensor 116 may detect when a door 118 of the vehicle 100 is moved. Specifically, vehicle doors, even when closed, may allow for a small range of motion in a horizontal direction. As such, in embodiments, a user may press into the door 118 (e.g., using their hands or feet) and the sensor 116 may detect the motion of the door 118. The sensor 116 may comprise a motion sensor that detects motion of the door 118, a pressure sensor that detects pressure applied to the door 118, or a camera that captures video of the door 118 and detects motion of the door 118 based on the captured video. In embodiments, the sensor 116 may be placed on an external or internal surface of the door 118 or may be placed within the vehicle 100.

Figure 2B:
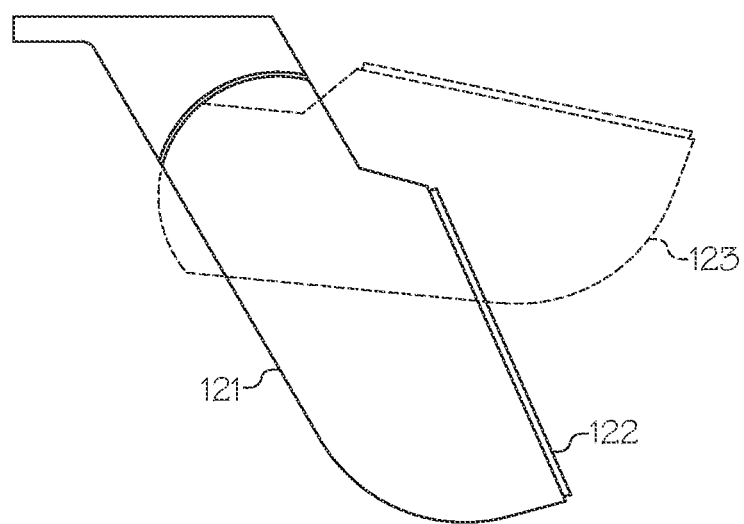
FIG. 2B schematically depicts a side-view mirror of the vehicle of FIG. 1, according to one or more embodiments shown and described herein.

The sensor 120 may detect when a side-view mirror 122 of the vehicle 100 is moved. Specifically, a side-view mirror of a vehicle may be moveable along a hinge. As such, in embodiments, a user may partially rotate the side-view mirror 122 from a use position 121 to a folded position 123 (as shown in FIG. 2B) and the sensor 120 may detect the motion of the side-view mirror 122. The sensor 120 may comprise a motion sensor that detects motion of the side-view mirror 122, a pressure sensor that detects pressure applied to the side-view mirror 122, or a camera that captures video of the side-view mirror 122 detects motion of the side-view mirror 122 based on the captured video. In embodiments, the sensor 120 may be placed on an external or internal surface of the side-view mirror 122.

Referring back to FIG. 1, the sensor 124 may detect when a fuel lid 126 of the vehicle 100 is moved. Specifically, a vehicle fuel lid may be affixed to a hinge and, even when closed, may allow for a small range of motion in a horizontal direction. As such, in embodiments, a user may press into the fuel lid 126 (e.g., using their hands or feet) and the sensor 124 may detect the motion of the fuel lid 126. The sensor 124 may comprise a motion sensor that detects motion of the fuel lid 126, a pressure sensor that detects pressure applied to the fuel lid 126, or a camera that captures video of the fuel lid 126 and detects motion of the fuel lid 126 based on the captured video. In embodiments, the sensor 124 may be placed on an external or internal surface of the fuel lid 126 or may be placed within a fuel compartment of the vehicle 100.

The sensor 128 may detect when a tailgate or rear hatch or trunk 130 of the vehicle 100 is moved. Specifically, the tailgate 130, even when closed, may allow for a small range of motion in a horizontal direction. As such, in embodiments, a user may press into the tailgate 130 and the sensor 128 may detect the motion of the tailgate 130. The sensor 128 may comprise a motion sensor that detects motion of the tailgate 130, a pressure sensor that detects pressure applied to the tailgate 130, or a camera that captures video of the tailgate 130 and detects motion of the tailgate 130 based on the captured video. In embodiments, the sensor 116 may be placed on an external or internal surface of the door 118 or may be placed within the vehicle 100.

Referring still to FIG. 1, the locking mechanism 103 may lock the hood 106, the locking mechanism 115 may lock the door 118, and the locking mechanism 127 may lock the tailgate 130. The actuators 105, 113, 117, 125, and 129 may actuate various components of the vehicle 100. In particular, the actuator 105 may unlock the locking mechanism 103 and open the hood 106. The actuator 113 may open the side window 114. The actuator 117 may unlock the locking mechanism 115 and/or open the door 118. The actuator 125 may open the fuel lid 126. The actuator 129 may unlock the locking mechanism 127 and/or open the tailgate 130.

Referring still to FIG. 1, the ECU 102 comprises one or more processors 134, one or more memory modules 136, and a communication path 138. The example of FIG. 1 shows the ECU 102 being located on the hood of the vehicle 100 for purposes of illustration. However, it should be understood that the ECU 102 may be located anywhere along or within the vehicle 100.

The one or more processors 134 may be a controller, an integrated circuit, a microchip, a computer, or any other computing device. The one or more memory modules 136 may comprise RAM, ROM, flash memories, hard drives, or any device capable of storing machine readable and executable instructions such that the machine readable and executable instructions can be accessed by the one or more processors 134. The communication path 138 may be communicatively coupled to and receive data from the sensors 104, 108, 112, 116, 120, 124, 128.

The one or more memory modules 136 include a database 140, key fob detection module 142, a sensor data reception module 144, and a vehicle component actuation module 146. Each of the database 140, the key fob detection module 142, the sensor data reception module 144, and the vehicle component actuation module 146 may be a program module in the form of operating systems, application program modules, and other program modules stored in the one or more memory modules 136. Each module may include, but is not limited to, routines, subroutines, programs, objects, components, data structures and the like for performing specific tasks or executing specific data types as will be described below.

The database 140 may store data associated with certain predetermined actions and certain vehicle functions to be performed when each predetermined action is performed (e.g., in a data table). As discussed above, when a user carries the key fob 132, the user may perform certain predetermined actions to cause certain vehicle functions automatically occur. The database 140 may store these associations between predetermined actions and vehicle functions to be performed.

In embodiments, a predetermined action may comprise moving a moveable component of the vehicle 100 or tapping or otherwise applying pressure to a component. For example, the database 140 may store data indicating that when a user presses down on the hood 106 (as detected by the sensor 104), the driver-side door should be unlocked, or when a user taps the side window 114, the side window 114 rolls down. Each possible action that may be detected by any of the sensors 104, 108, 112, 116, 120, 124, 128 may be associated with one or more vehicle functions to be performed.

In the illustrated example, the vehicle functions to be performed may include unlocking a vehicle component of the vehicle 100 (e.g., a door) or opening a vehicle component of the vehicle 100 (e.g., a door, a window, the trunk, and the like). However, in other examples, the database 140 may associate predetermined actions with other vehicle functions (e.g., starting the vehicle ignition, and the like).

By associating different predetermined actions with different vehicle functions, a user may utilize different predetermined actions to perform different vehicle functions. For example, performing a first predetermined action and then a second predetermined action different from the first predetermined action may be set to perform different vehicle function compared to just the performing the first predetermined action or the second predetermined action. Specifically, tapping on the side window 114 may cause the window to roll down, and pressing on the door 118 may cause the door to unlock. In some examples, a user may program different predetermined actions to cause particular vehicle functions to be performed. In some examples, a sequence of predetermined actions may be required to cause a vehicle function to occur. For example, pressing down on the hood 106 and then tapping on the front window 110 may cause the door 118 to open.

The key fob detection module 142 may receive a signal from the key fob 132 and detect the presence of the key fob 132 in proximity to the vehicle 100. In particular, the key fob detection module 142 may determine whether the key fob 132 is within a predetermined distance (e.g., 20 feet) of the vehicle 100. In the illustrated example, the key fob detection module 142 may detect a radio frequency identification (RFID) signal transmitted by the key fob 132. However, in other examples, the key fob 132 may transmit other types of signals (e.g, Bluetooth, NFC), which may be detected by the key fob detection module 142.

As discussed above, a user can perform a predetermined action in order to cause a vehicle function to be automatically performed. However, the vehicle function should only occur if the predetermined action is performed by a user carrying the key fob 132. Thus, by determining whether the key fob 132 is within a predetermined distance from the vehicle 100, the ECU 102 may ensure that vehicle functions only occur when predetermined actions are performed by a user carrying the key fob 132. In other examples, other techniques may be utilized to ensure that the predetermined actions are performed by an authorized user, such as the driver. For example, the ECU 102 may determine whether the user is carrying a smartphone or other device, or the ECU 102 may perform facial recognition to validate the user's identity.

The sensor data reception module 144 may receive data from one or more of the sensors 104, 108, 112, 116, 120, 124, 128. In particular, the sensor data reception module 144 may determine whether a predetermined action has been performed by a user based on the data received from one or more of the sensors 104, 108, 112, 116, 120, 124, 128. As discussed above, the database 140 may store data indicating certain predetermined actions that cause particular vehicle functions to be performed. Accordingly, the sensor data reception module 144 may determine whether a predetermined action stored in the database 140 has been performed based on sensor data received from one or more of the sensors 104, 108, 112, 116, 120, 124, 128.

The vehicle component actuation module 146 may cause one or more vehicle functions to be performed by the vehicle 100. In particular, the vehicle component actuation module 146 may actuate one or more of the actuators 105, 113, 117, 125, and/or 129 to cause one or more vehicle functions to be performed. As discussed above, the database 140 may store data indicating certain vehicle functions to be performed when particular predetermined actions are performed. As such, when certain predetermined actions are performed, the vehicle component actuation module 146 may cause the appropriate vehicle functions to be performed.

In the illustrated embodiment, the vehicle component actuation module 146 may cause the actuator 105 to unlock and/or open the hood 106, cause the actuator 113 to open the side window, cause the actuator 117 to unlock and/or open the door 118, cause the actuator 125 to open the fuel lid 126, or cause the actuator 129 to unlock and/or open the tailgate 130. However, in other examples, the vehicle component actuation module 146 may cause other vehicle functions to be performed with respect to the vehicle 100. For example, the vehicle component actuation module 146 may cause the vehicle ignition to start, adjust the position of one or more vehicle seats, adjust climate control settings, adjust audio settings, and the like.

Figure 3:
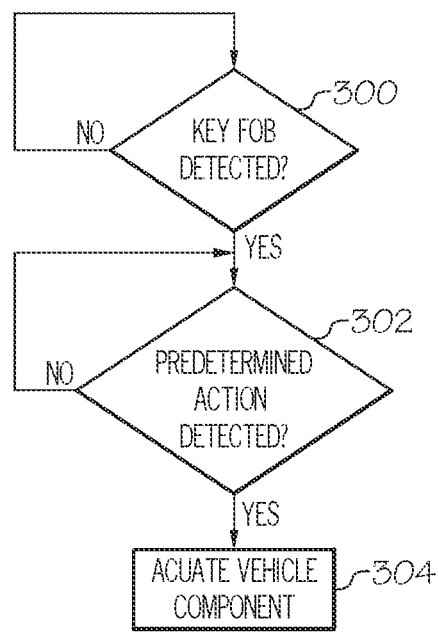
FIG. 3 depicts a flowchart of a method of operating the electronic control unit of FIG. 1, according to one or more embodiments shown and described herein.

FIG. 3 depicts a flowchart of an example method for operating the ECU 102 of FIG. 1. At step 300, the key fob detection module 142 determines whether the key fob 132 is within a predetermined distance from the vehicle 100. In particular, the key fob detection module 142 may receive a signal from the key fob 132 and determine whether the key fob 132 is within the predetermined distance from the vehicle 100 based on the received signal. If the key fob detection module 142 determines that the key fob is not within the predetermined distance of the vehicle 100 ("No" at step 300), control returns to step 300. Alternatively, when the key fob detection module 142 determines that the key fob is within the predetermined distance of the vehicle 100 ("Yes" at step 300), control passes to step 302.

At step 302, the sensor data reception module 144 determines whether a predetermined action has been performed. In particular, the sensor data reception module 144 may receive signals from one or more of the sensors 104, 108, 112, 116, 120, 124, 128, and determine whether a predetermined action has been performed based on one or more received signals. The sensor data reception module 144 may access the database 140 to identify one or more predetermined actions that have been defined, and may determine whether any of the predetermined actions stored in the database 140 have been performed based on received sensor data. If the sensor data reception module 144 determines that no predetermined actions have been performed ("No" at step 302), control returns to step 302. Alternatively, if the sensor data reception module 144 determines that a predetermined action has been performed ("yes" at step 302), control passes to step 304.

At step 304, the vehicle component actuation module 146 causes one or more components of the vehicle 100 to unlock or open based the predetermined action that has been performed, as determined by the sensor data reception module 144. In particular, the vehicle component actuation module 146 may access the database 140 and identify one or more vehicle functions associated with the predetermined action detected by the sensor data reception module 144. The vehicle component actuation module 146 may then actuate one or more vehicle components to cause the identified one or more vehicle functions to be performed.

While particular embodiments have been illustrated and described herein, it should be understood that various other changes and modification may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed:

1. A vehicle system for a vehicle comprising an electronic control unit configured to:
   receive a signal from a key fob;
   determine whether the key fob is within a predetermined distance from the vehicle based on the received signal; and
   upon determination that the key fob is within the predetermined distance from the vehicle:

determine whether a predetermined action has been performed by a user based on an output from one or more vehicle sensors, the predetermined action comprises moving a moveable component of the vehicle other than a door handle; and upon determination that the predetermined action has been performed, cause a component of the vehicle to at least unlock or open.

2. The vehicle system of claim 1, wherein the moveable component comprises a hood of the vehicle.

3. The vehicle system of claim 1, wherein the moveable component comprises a fuel lid of the vehicle.

4. The vehicle system of claim 1, wherein the moveable component comprises a tailgate of the vehicle.

5. The vehicle system of claim 1, wherein the moveable component comprises a door of the vehicle.

6. The vehicle system of claim 1, wherein the moveable component comprises a side-view mirror of the vehicle.

7. The vehicle system of claim 1, wherein at least one of the one or more vehicle sensors detects movement of the moveable component of the vehicle.

8. The vehicle system of claim 1, wherein at least one of the one or more vehicle sensors detects pressure applied to the moveable component of the vehicle.

9. The vehicle system of claim 1, wherein at least one of the one or more vehicle sensors comprises a microphone.

10. The vehicle system of claim 1, wherein at least one of the one or more vehicle sensors comprises a camera.

11. A vehicle system for a vehicle comprising an electronic control unit configured to:
receive a signal from a key fob;
determine whether the key fob is within a predetermined distance from the vehicle based on the received signal; and
upon determination that the key fob is within the predetermined distance from the vehicle:
determine whether a predetermined action has been performed by a user based on an output from one or more vehicle sensors, the predetermined action comprises tapping a window of the vehicle; and
upon determination that the predetermined action has been performed, cause a component of the vehicle to at least unlock or open.

12. The vehicle system of claim 11, wherein at least one of the one or more vehicle sensors detects pressure applied to the window of the vehicle.

13. The vehicle system of claim 11, wherein at least one of the one or more vehicle sensors comprises a microphone.

14. The vehicle system of claim 11, wherein at least one of the one or more vehicle sensors comprises a camera.

15. A vehicle system for a vehicle comprising an electronic control unit configured to:
receive a signal from a key fob;
determine whether the key fob is within a predetermined distance from the vehicle based on the received signal; and
upon determination that the key fob is within the predetermined distance from the vehicle:
determine whether a predetermined action has been performed by a user on a vehicle component based on an output from one or more vehicle sensors, the at least one of the one or more vehicle sensors detects pressure applied to the vehicle component; and
upon determination that the predetermined action has been performed, cause a component of the vehicle to at least unlock or open.

16. The vehicle system of claim 15, wherein the at least one of the one or more vehicle sensors is mounted on the vehicle.

17. The vehicle system of claim 16, wherein the vehicle component is a component of the vehicle other than a door handle.

* * * * *